Patented July 3, 1945

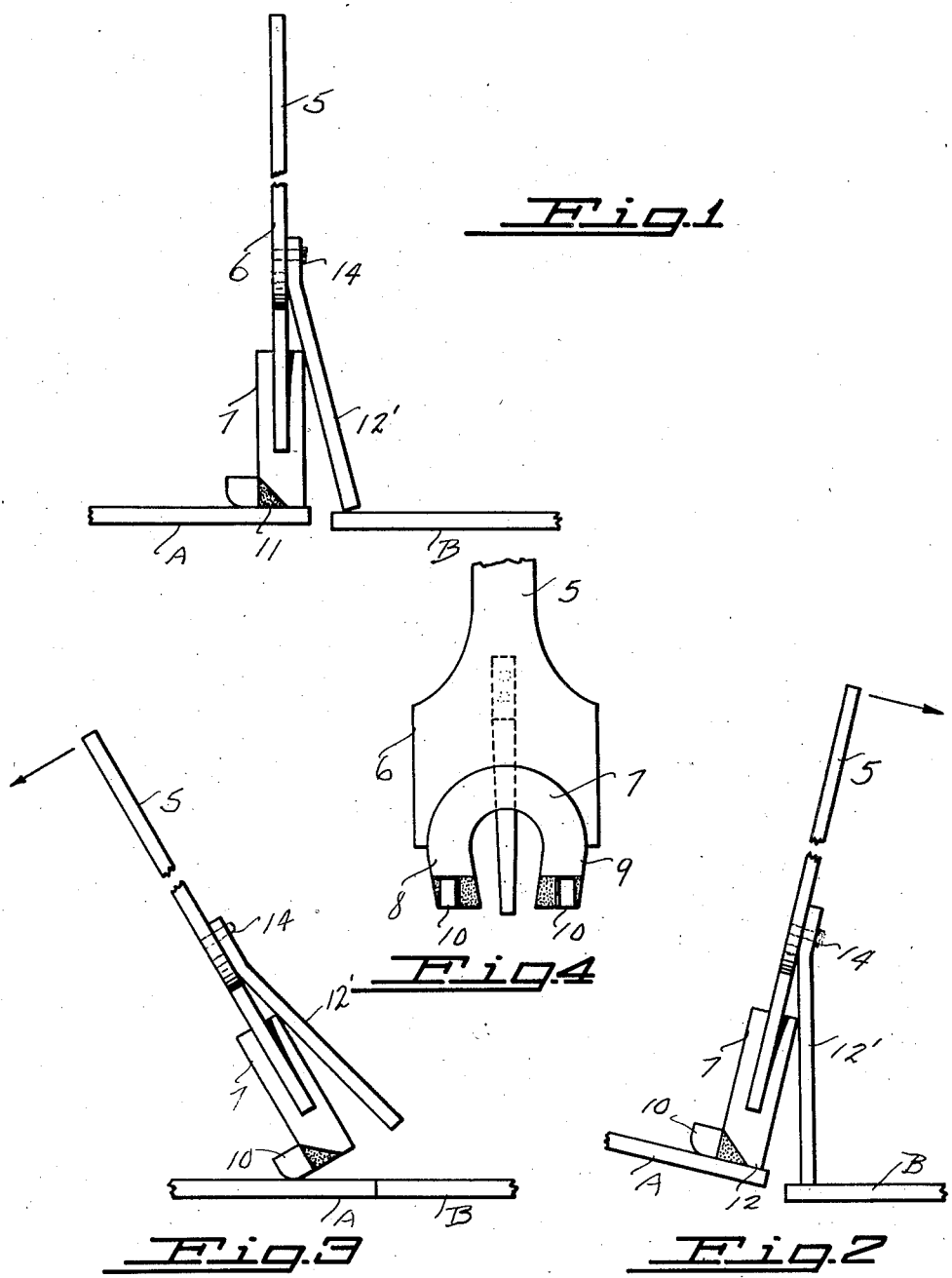

2,379,596

UNITED STATES PATENT OFFICE 2,379,596

MAGNETIC LIFTING DEVICE

James W. Seamans, San Leandro, Calif.

Application June 12, 1944, Serial No. 539,938

3 Claims. (Cl. 294—65.5)

This invention relates to a device or apparatus for manipulating metal plates and has particular reference to a hand operated implement for pulling together sheet metal plates, iron, angles, and beams to be tack welded.

The principal object of the invention is the provision of magnetic means in the device whereby metal plates and the like may be readily lifted and quickly and easily aligned, prior to the tack welding operation, thus facilitating the work of the welder or other craftsman.

A further object of the invention is the provision of adjustable means, whereby the handle of the device may be readily adjusted to compensate for differences in levels of the plates to be aligned.

A further object of the invention is the provision of a hand operated implement of the character described, that is simple in construction, economical to manufacture, strong, durable, positive in operation, and highly serviceable in use.

Other objects and advantages will be apparent during the course of the following description:

In the accompanying drawing wherein I have illustrated the preferred embodiment of the invention—

Fig. 1 is a side elevational view of the implement disclosed in operative position and contacting the plates to be aligned, Fig. 2 is a similar view disclosing the lifting operation of the implement, and Fig. 3 is a similar view illustrating the position of the apparatus after the plates have been aligned, and Fig. 4 is an enlarged fragmentary front elevation disclosing to advantage the magnet of the invention.

In the construction of various types of ships, aeroplanes, and the like, large sheets of metal are employed that are welded together to form the sides and different compartments. In practice it is customary to align the sheets with their longitudinal edges and to retain the same in the proper position so that the welding operation can be completed to weld the two sheets. To align and hold the sheets by hand is an exceedingly difficult task and furthermore in conventional practice when plates are to be aligned for tack welding, it is first necessary to weld apertured lugs to one of the plates to be aligned and to then resort to the use of a crowbar, inserted through the opening of the lug, to move one plate in alignment with the other plate. The employment of lugs is time taking and costly, and the operation of lifting the plate in this manner is very laborious.

To therefore introduce to the trade a type of magnetic lifting device that is most effective in operation, and wherein bottom or base plates, overhead and side plates, may be quickly and satisfactorily aligned, I have devised the present invention.

In the accompanying drawing the reference characters A and B designate two plates to be aligned. While plates are illustrated the parts to be pulled together may be angle irons, beams, or the like. The device for accomplishing this operation comprises a metallic handle 5 having an enlarged base 6 to which is secured a horseshoe magnet 7, having spaced magnetic legs 8 and 9. Clips 10 are insulated as at 11 from the bases 12 of the magnet legs 8 and 9. The clips are preferably made of brass, aluminum, or similar non-magnetic material. If desired, clamps or similar fastening means may be employed to secure the clips to the legs. The principle herein embodied is the pulling of a metal plate A, to a position in alignment with the metal plate B, and to provide means for breaking the contact by use of non-magnetic clips.

As disclosed to advantage in the drawing, the numeral 12 indicates a pusher bar that is adjustably secured at one end as at 14 to the handle 5, and has the body thereof extending at an angle to the handle and providing a pushing surface when in contact with the plate B.

Accordingly by the arrangement set forth and when it is desired to pull the plate A to a position in alignment with the plate B, the device is placed in operative position as disclosed in Fig. 1. The legs of the magnet will securely grip the plate A, and a movement of the handle in the direction of the arrow of Fig. 2, will cause downward pressure on the plate B. Accordingly the plate A will be pulled into alignment with said plate B, while under the influence of the magnet. After the plates have been suitably aligned, as disclosed in Fig. 3, a movement of the device in the direction of the arrow of Fig. 3 will effect a breaking of the magnetic contact occasioned by a rocking of the non-magnetic clips on the surface of the plate A. The tack welding previously referred to is then completed.

It is to be understood that the form of my invention herewith shown and described is to be taken as a preferred example of the same and that various changes relative to the shape, size, material, and arrangement of parts, may be resorted to without departing from the principle of the invention or the scope of the sub-joined claims.

Having thus described my invention, I claim:

1. A device for lifting a metal plate or the like to align the same with an adjacent plate, said device comprising a handle, a magnet connected to said handle, non-metallic clips insulated from said magnet, and a pusher bar carried by said handle, said bar capable of exerting pressure on the adjacent plate.

2. A device for lifting a metal plate or the like to align the same with an adjacent plate, said device comprising a base portion having a handle, a horseshoe magnet connected to said base portion and positioned on one of the plates, non-metallic clips insulated from said magnet, and a pusher bar secured to said base member, said bar capable of exerting pressure on the adjacent plate.

3. A device for lifting a metal plate or the like to align the same with an adjacent plate prior to a tack welding operation, said device comprising a base portion having a handle, a horseshoe magnet connected to said base portion and positioned on one of the plates, non-metallic clips insulated from said magnet, and a pusher bar adjustably connected to the handle, said bar capable of exerting pressure on the adjacent plate.

JAMES W. SEAMANS.